April 16, 1946.  R. E. RUNDELL  2,398,450
STEMMING AND SHREDDING APPARATUS
Filed Aug. 7, 1943  5 Sheets-Sheet 1
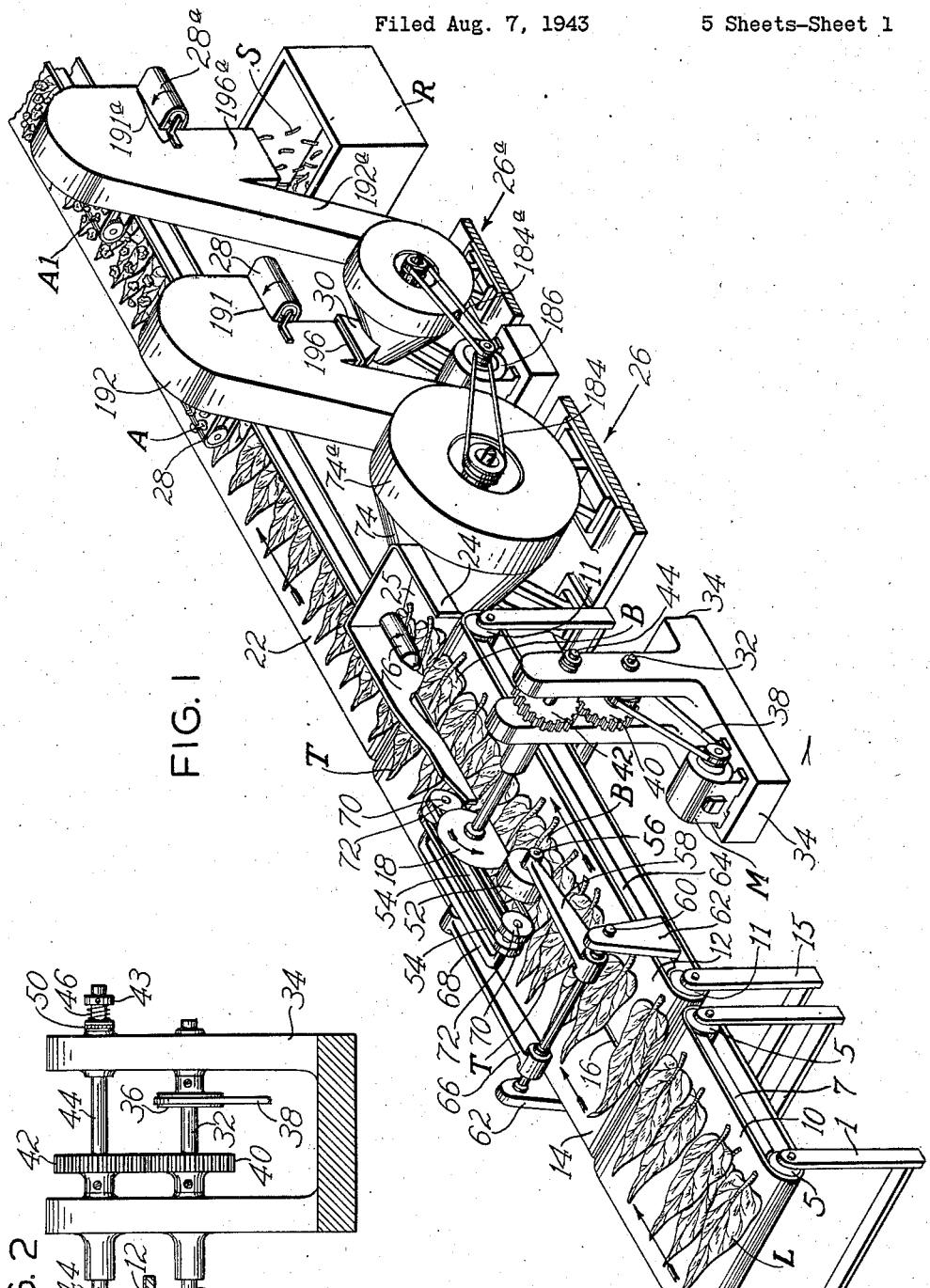
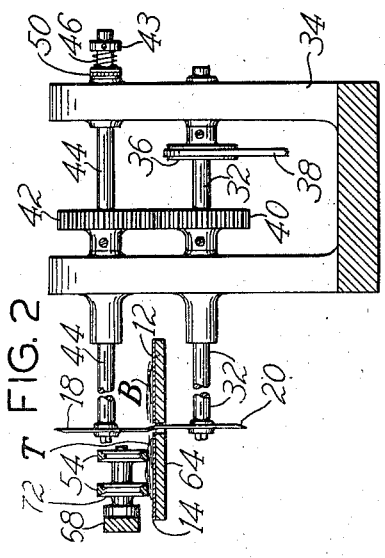
INVENTOR
RUPERT E. RUNDELL
BY *Georges Hastings*
ATTORNEY

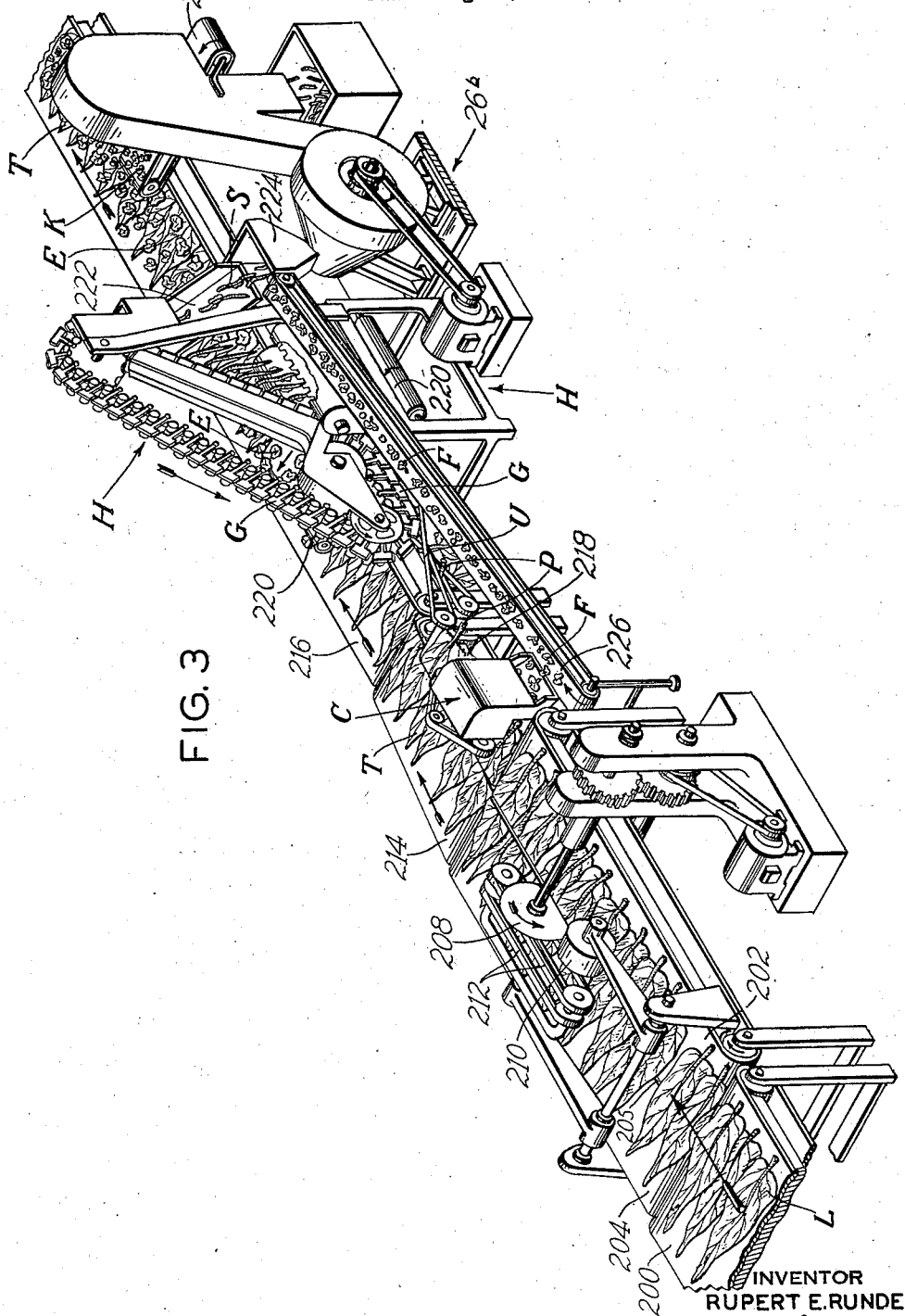

April 16, 1946.  R. E. RUNDELL  2,398,450
STEMMING AND SHREDDING APPARATUS
Filed Aug. 7, 1943   5 Sheets-Sheet 3

INVENTOR
RUPERT E. RUNDELL
BY
ATTORNEY

April 16, 1946.　　　R. E. RUNDELL　　　2,398,450
STEMMING AND SHREDDING APPARATUS
Filed Aug. 7, 1943　　　5 Sheets-Sheet 4
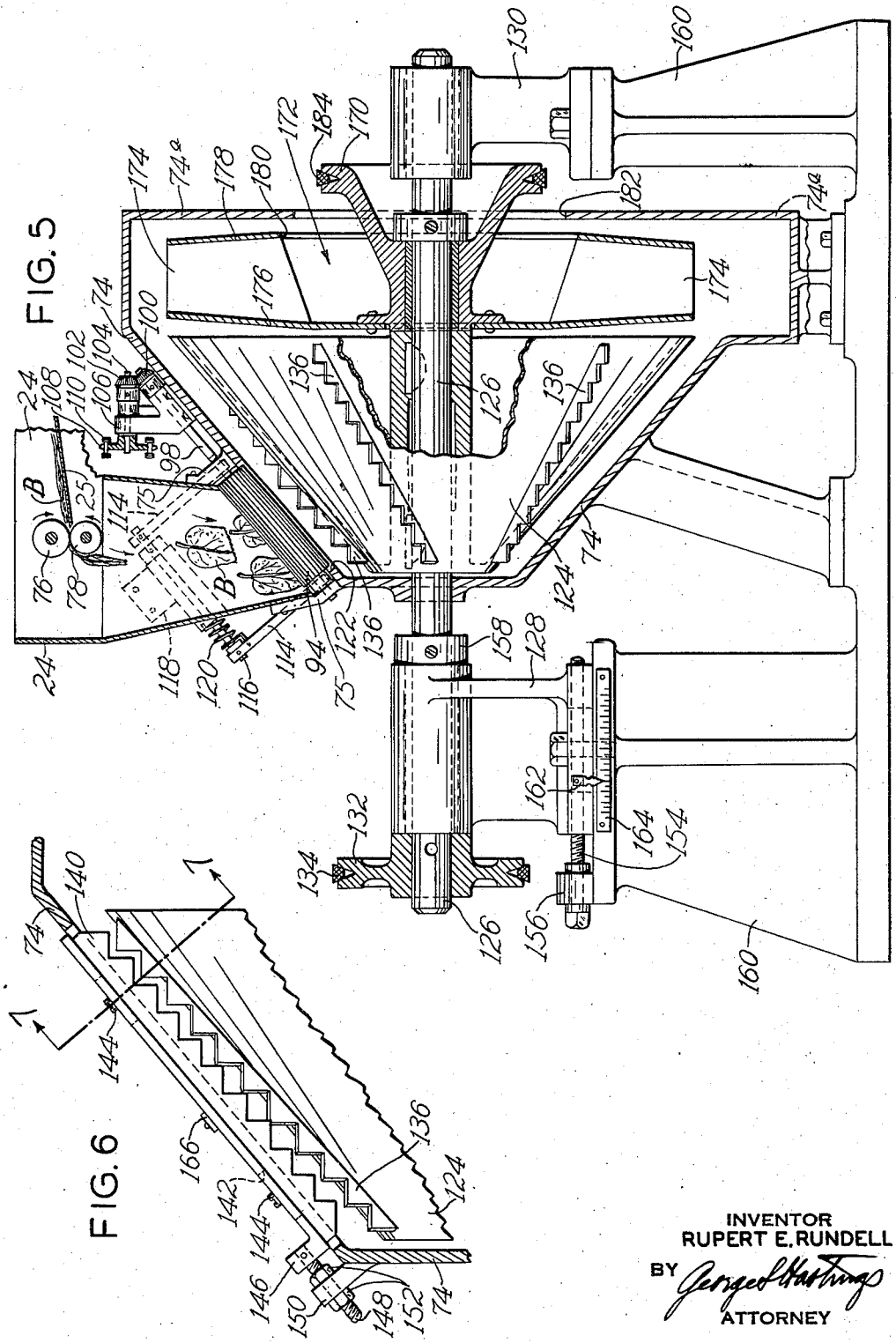
INVENTOR
RUPERT E. RUNDELL
BY
ATTORNEY April 16, 1946. R. E. RUNDELL 2,398,450
STEMMING AND SHREDDING APPARATUS
Filed Aug. 7, 1943 5 Sheets-Sheet 5

INVENTOR
RUPERT E. RUNDELL
BY *George Hastings*
ATTORNEY

Patented Apr. 16, 1946

2,398,450

UNITED STATES PATENT OFFICE 2,398,450

STEMMING AND SHREDDING APPARATUS

Rupert E. Rundell, Rockville Centre, N. Y., assignor to American Machine & Foundry Company, a corporation of New Jersey Application August 7, 1943, Serial No. 497,747

15 Claims. (Cl. 131—129)

This invention relates to the stemming of leaf tobacco, more particularly to a novel apparatus for performing the stemming operation. Heretofore the laminae were stripped from the stems of tobacco leaves by machines of the type shown in my prior Patent No. 1,968,098. In the operation of such machines there is a certain proportion of "drop leaves" which are pulled out of the grippers of the stemming mechanism and must be collected and stemmed by hand or in a thresher. Moreover flags are left on the stripped stems which require additional threshing and winnowing to remove these flags.

These machines are also equipped with mechanism for threshing the butt ends of the leaves to assure retention of the stem butts in the grippers of the stemming mechanism, the construction of the butt threshing mechanism being of the type shown in my prior Patent No. 2,050,765. Thus, as much as two to three inches of the tobacco is removed from the butt ends of the leaves and formed into scrap tobacco by said butt threshing mechanism together with broken stems, which need to be threshed and winnowed to effect separation of the laminae from the stem portions.

An object of my invention is to avoid the labor required for stemming or handling "drop leaves" and yet obtain a much greater output with much less labor. To this end, a layer of outspread tobacco leaves is continuously advanced and the leaves are severed at a predetermined point to separate the tip portions from the butt end portions thereof. The severed tip portions, which may constitute as much as a half or any other desired fraction of the leaves, are conveyed to various conditioning, casing and shredding machines which are employed in the manufacture of cigarette tobacco. The severed butt end portions are fed directly to a shredder of novel construction wherein the laminae are beaten off the stems and winnowed and returned to the conveyor whereon the severed stem butts are advanced. Thus with a single handling of the leaves they are prepared for delivery to the conditioning, casing and shredding machines.

The shredder is provided with opposed thresher bars between which the stem portions can pass, the bars having a novel construction to remove the laminae of greater size therefrom and without breaking the stems into small pieces. The scrap tobacco pieces so removed from the stems are of a size averaging two to three inches in length. Since the stem portions are larger than those produced by prior threshing and winnowing devices, it is possible to secure a better separation of stem portions and laminae and to separate stems from larger leaf portions than heretofore possible.

In a modified form of the invention the severed butt end portions may be advanced through a butt threshing mechanism and delivered to the grippers of a stemming machine. The stripped butt end leaf portions are deposited on the severed tip portions, and the leaf fragments and the stem portions from the butt threshing mechanism, and the stripped stems from the stemming machine, are delivered to the threshing and winnowing device. By stemming the severed butt end portions instead of whole leaves, as heretofore, there is less danger of pulling the stem butts out of the grippers of the stemming mechanism. Therefore fewer "drop" leaves will result.

Another object of the invention is to provide a stemming and threshing unit which employs a stepped or triangular tooth form and adjustable supports for the teeth whereby larger pieces are obtained than have hitherto been obtainable with thresher type stemmers.

It is a further object to provide for adjustment of the stepped or triangular teeth in directions approximately at right angles to each other, so that the edges of the teeth on one side may be brought closer together or further apart without changing the spacing of the tooth edges on the other side, and thus the optimum spacing may be obtained. The spacing at the other side of the teeth may be similarly varied, and if desired the spacing at either side of the teeth may be varied while the spacing at the opposite side thereof is adjusted.

Another object of the invention is to provide a conical type shredder or thresher having the above mentioned type of thresher teeth and adjustment thereof.

With these and other objects not specifically mentioned in view, the invention consists in certain combinations which will be hereinafter described.

In the accompanying drawings, which form a part of this specification:

Fig. 1 is an isometric view illustrating an improved method and apparatus for stemming and threshing tobacco leaves, the forward bearing support of each of the shredder cone shafts being broken away to expose the drive pulleys of their fans;

Fig. 2 is an end elevation, partly in section, of the tobacco leaf cutting mechanism;

Fig. 3 is an isometric view illustrating a modification of the improved method and apparatus for stemming and threshing tobacco leaves, the forward bearing support of the shredder cone shaft being broken away to expose the drive pulley of the fan;

Fig. 5 is a sectional side elevation of the improved cone thresher taken on line 5—5 of Fig. 4;

Fig. 6 is a sectional detail view of the threshing bars of the improved cone shredder;

Figure 4:
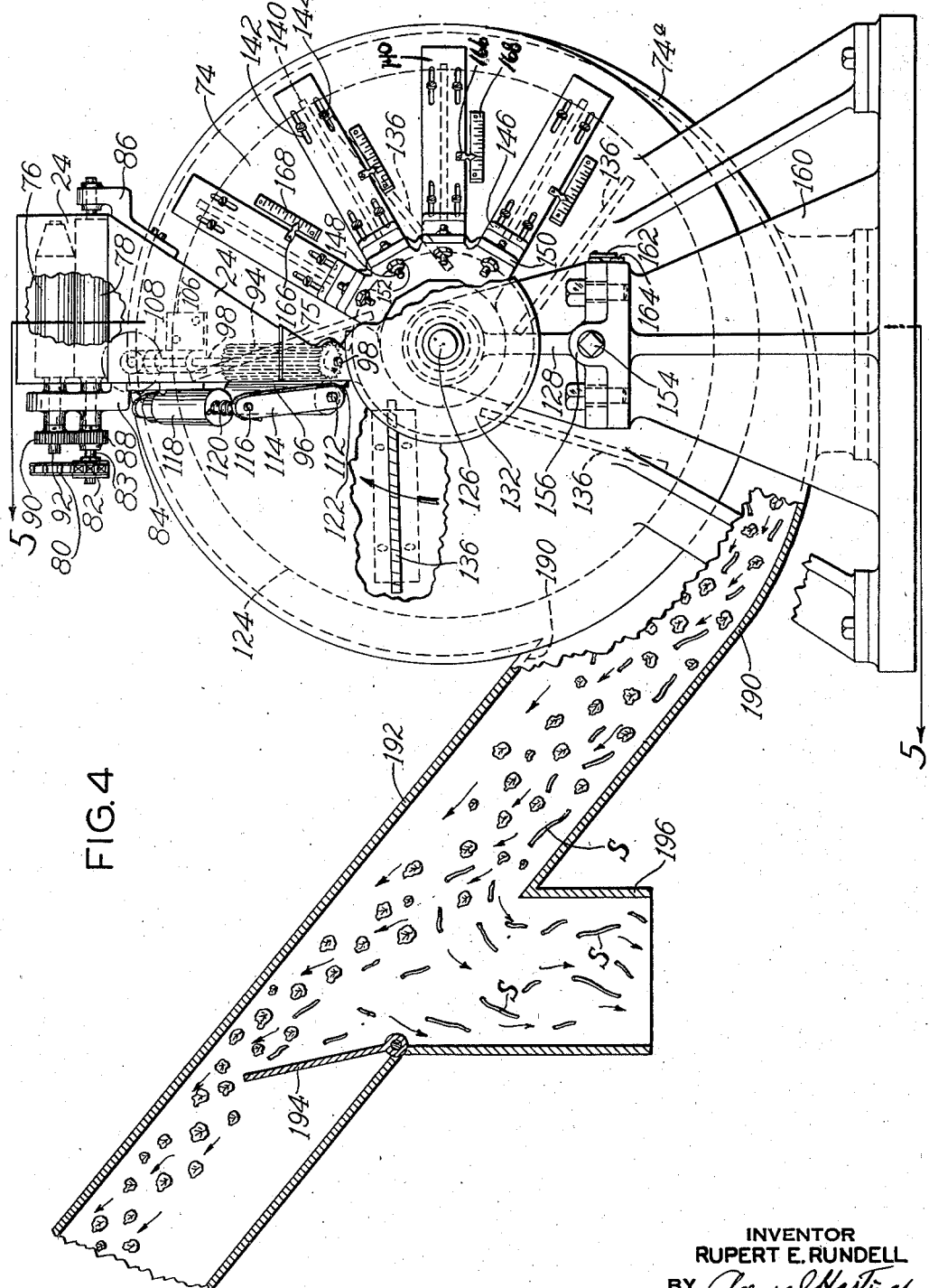
Fig. 4 is an end elevation, partly in section, of the improved cone thresher.

Referring to the embodiment of my invention shown in Fig. 1 of the drawings, an operator spreads the tobacco leaves L on to an endless conveyor belt 10 which is supported by rollers 5 and table 7 carried by a frame 1. The belt is suitably driven to deliver said leaves on to a pair of traveling conveyor belts 12 and 14 carried by rollers 11 mounted on a frame 15 and sufficiently separated to provide a narrow space 16 through which protrudes a rotating knife 20 which coacts with a rotating knife 18 (Figs. 1 and 2). While passing between these knives the tobacco leaves L are cut in half. Thus the tip end T of the leaf, which has the unobjectionable smaller stem portion that may be utilized, is severed from the butt end B of the leaf which has the coarse and heavy stem portion which must be removed.

After this cutting operation the tip portions T are delivered on to another traveling conveyor belt 22 while the butt end portions are dropped into a hopper 24 of an improved cone thresher 26 wherein the laminae are removed from the stems. The winnowed laminae A are delivered from cone thresher 26 upon a feed belt 28 which carries the same to the conveyor belt 22 where they drop on to the tip portions T forwarded by said conveyor belt.

In order to assure a thorough cleaning of the stems, delivered from cone thresher 26, they are directed into an intake 30 of another cone thresher 26a which is of a construction similar to thresher 26. The laminae A1 removed from these stems are deposited on a feed belt 28a which also delivers them upon the tip portions T advanced on conveyor belt 22. The now thoroughly cleaned stems S are deposited in a suitable receptacle R (Fig. 1).

The conveyor belt 22 carries the tip portions T of the tobacco leaves together with the laminae A and A1 into a suitable tobacco cutter (not shown) wherein said tobacco is cut into shreds as is customary in the manufacture of cigarette tobacco. Thus by a single feeding of the leaves L the latter are stripped and freed of stems without other manual operations or handling.

The knife disks 18 and 20 which sever the tip portions of the leaf from the butt portions of the same are driven in opposite directions (Figs. 1 and 2) by means of a motor M. Knife 20 is mounted on a shaft 32 supported by suitable bearings of a frame 34. Said shaft 32 carries a pulley 36 which by means of a belt 38 is driven from the motor M. On shaft 32 is furthermore mounted a gear 40 meshing with a gear 42 secured to a shaft 44 on which is fastened the knife disk 18. Shaft 44 is yieldingly mounted in suitable bearings of the frame 34, a spring 46 being provided to keep knife 18 in engagement with knife 20, thus effecting a cutting as well as a shearing action of said knives. The spring 46 bears against a collar 43 of shaft 44 and a thrust bearing 50 located adjacent a suitable hub of frame 34.

In order to avoid any disturbance or shifting of the leaves L when contacting the rotating knives 18 and 20, a weight 52 and a pair of guide belts 54 are provided. The latter also serve the purpose of keeping the tip ends T of the leaves flat on the conveyor belt 14 while passing said rotating knives. The weight 52 may be of a disk or drum shape and pivoted to a stud 56 so that it will roll on the leaves L passing underneath the same. The stud 56 is held by an arm 58 loosely mounted on a shaft 60 held in suitable bearing brackets 62 attached to a conveyor table 64 underlying the upper runs of belts 12 and 14. On shaft 60 is furthermore loosely mounted an arm 66 to which is pivoted a suitable bracket 68 carrying a pair of studs 70. On each stud 70 are loosely mounted a pair of pulleys 72 supporting the guide belts 54 mentioned heretofore. These guide belts are not driven, but move with the advancing tobacco leaves on the conveyor belt 14 which is suitably driven by means not shown.

The hopper 24 into which the butt ends B of the tobacco leaves L are fed by the conveyor belt 12, is attached to suitable flanges 75 projecting upwardly from the cone thresher housing 74 (Figs. 4 and 5). The upper portion of hopper 24 is equipped with a pair of rotating feed rollers 76 and 78. Roller 78 is constantly driven from a suitable source of power (not shown) by means of a chain 80 running over a sprocket 82 fastened to a shaft 83 to which feed roller 78 is secured (Fig. 4). Shaft 83 is supported by suitable bearing brackets 84 and 86 mounted on the upper portion of hopper 24. Shaft 83 furthermore carries a gear 88 meshing with a gear 90 secured to a shaft 92 on which feeder roller 76 is mounted, shaft 92 being supported in the bracket 84. At the bottom of hopper 24 is mounted another pair of feed rollers 94 and 96. The latter are arranged transversely with respect to feed rollers 76 and 78. Roller 94 is suitably fluted and mounted on a shaft 98 supported in the flanges 75 of housing 74. To shaft 98 is fastened a bevel gear 100 constantly driven by a bevel gear 102 (Fig. 5) mounted on a shaft 104 supported by a bearing bracket 106 attached to housing 74. Shaft 104 also carries a sprocket 108 driven from a suitable source of power (not shown) by means of a chain 110. The fluted feed roller 94 works in conjunction with the yieldingly mounted feed roller 96. The latter is loosely mounted on a shaft 112 (Fig. 4) supported by a pair of arms 114 (Figs. 4 and 5) which are secured to a shaft 116 journaled in a bearing bracket 118 attached to a side wall of hopper 24. A torsion spring 120 anchored to bracket 118 and secured in one of the arms 114 provides yielding mounting of roller 96 which maintains the latter in contact with the constantly rotating fluted roller 94.

As the butt portions B are delivered into the hopper 24 by means of conveyor belt 12, they are fed across a plate 25 in the upper end of the hopper 24 so that they will be engaged by the constantly rotating rollers 76 and 78 which feed said butt portions into the lower portion of said hopper where they are engaged by rollers 94 and 96 and fed through a suitable slot 122 (Fig. 5) of housing 76 on to the thresher cone 124. Feed rollers 76 and 78 are employed for the purpose of guiding the butt end portions B in such a manner that they drop into the lower portion of hopper 24 with the cut portion first and the heavy stem portion pointing upward. It is also important that fluted feed roller 94 revolve at a much slower linear speed than the thresher bars on the thresher cone, thus assuring that the leaves are held back while thresher bars 136 of the revolving thresher cone beat off the laminae of the severed butt end portions. The thresher cone 124 is mounted on a horizontal shaft 126 supported by bearing brackets 128 and 130. Shaft 126 carries a pulley 132 which by means of belt 134 is driven by a motor or other suitable source of power. To the thresher cone 124 are rigidly attached a number of beater bars 136 having triangular teeth which project into the space between the thresher cone and the conical portion of the stationary housing 74.

Beater bars 136 are arranged more or less spirally on the cone 124, as shown in Figs. 5 and 6, thus effecting more of a stripping action than a beating action which in turn assures greater size of laminae and prevents the stems from being broken up into small pieces. The beater bars 136 while revolving with cone 124, co-act with a set of stationary beater bars 140 adjustably mounted on the interior of housing 74 and provided with triangular teeth which also project into the space between cone 124 and housing 74. The step-shaped ridges or teeth of beater bars 136 and 140 are so arranged as to interfit with each other.

In order to accommodate leaves and stems of various sizes the bars 140 may be adjusted longitudinally so that the teeth of opposed beater bars may have the desired interfitting relationship. The flange portions of the stationary beater bars 140, which are located on the exterior of housing 74, are provided with slots 142 wherein are positioned screws 144 threaded into the housing 74. The bars 140 are also equipped with lugs 146 holding a threaded stud 148 slidably engaging with a lug 150 of housing 74. A pair of lock nuts 152 secure stud 148 in lug 150 and thereby maintain beater bar 140 in any desired position to which it may be adjusted longitudinally. Since housing 74 is of the same frusto-conical shape as thresher cone 124 any longitudinal adjustment of beater bars 140 will vary the width of the horizontal space between the teeth of beater bars 140 and beater bars 136. After each setting screws 144 are tightened again to lock beater bars 140 in place.

The vertical space between the teeth of bars 140 and 136 may be regulated by effecting a corresponding horizontal movement of the thresher cone 124. Since the latter is keyed on to shaft 126, the entire shaft is moved by turning a threaded spindle 154 (Fig. 5). Said spindle is loosely mounted in a lug 156 of a supporting frame 160 and threaded into the base of bearing bracket 128 slidably mounted on said frame 160. Since movement of shaft 126 relative to bracket 128 is prevented by means of pulley 132 and a collar 158, any horizontal movement of said bracket will be imparted also to shaft 126. The latter is furthermore slidably supported by the bearing bracket 130 rigidly secured to the frame 160. In order to provide indication of the vertical spacing between the teeth of the thresher bars 136 and 140, an indicator finger 162 is secured to the base of bracket bearing 128. Said finger 162 designates the position of said bracket on a scale plate 164 attached to the supporting flange of frame 160. Similar means for indication of the horizontal spacing of the teeth of the beater bars is provided by the employment of indicator fingers 166 and scale plates 168. A series of plates 168 are attached to the exterior of housing 74 while fingers 166 are secured to the top of thresher bars 140 (Fig. 4).

On the thresher cone shaft 126 is loosely mounted a suitable pulley 170 to which is rigidly secured a fan 172 equipped with a number of radial vanes 174 carried by a solid rear disk 176 which is attached to the hub of said pulley 170. The front of the fan is covered by a disk 178 provided with a central opening 180 of approximately the size of a central opening 182 in housing 74 serving as an air intake. Pulley 170 and fan 172 are constantly rotated, independently of thresher cone 124, by means of a belt 184 and a motor 186 (Figs. 1 and 5), and thus the fan may be revolved at a speed higher or lower than the cone.

Figure 8:
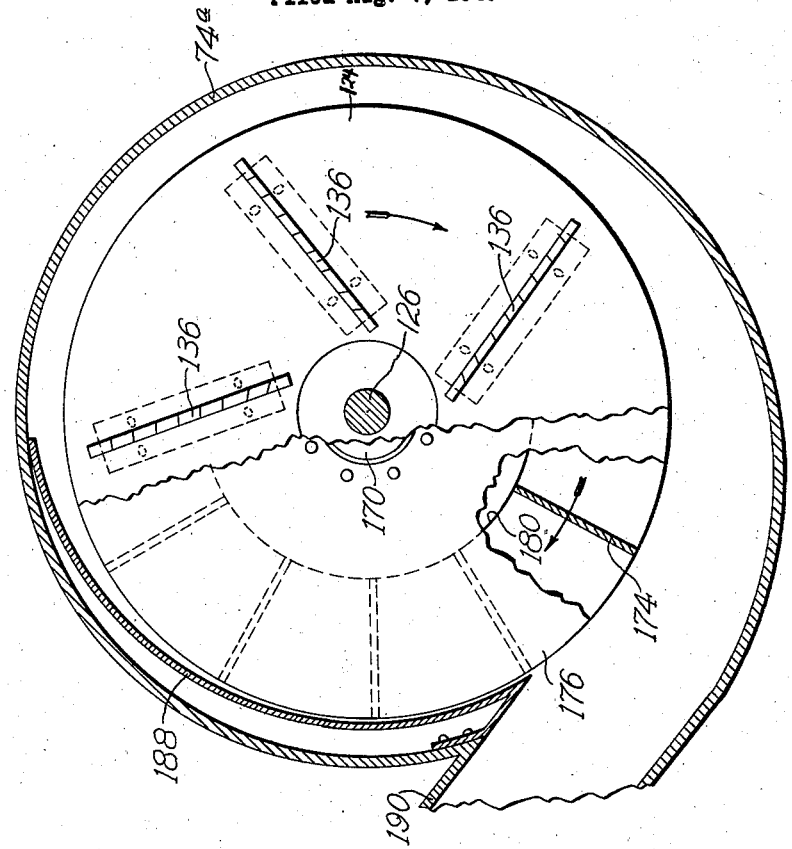
Fig. 8 is an end elevation of the thresher cone and blower fan of the improved cone thresher.
Figure 7:
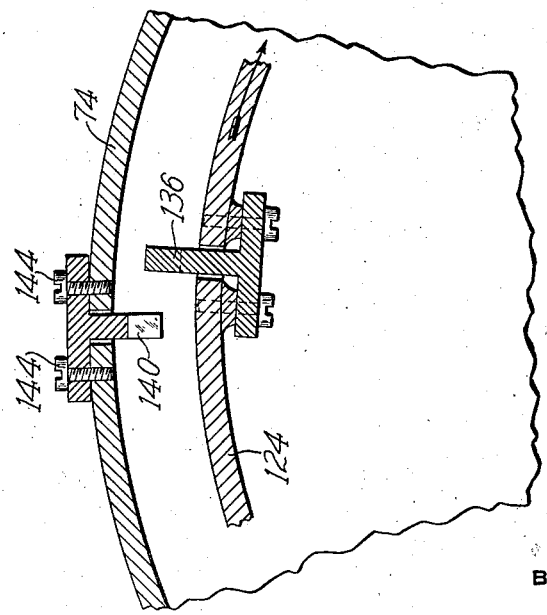
Fig. 7 is a cross-section of the threshing bars, taken on line 7—7 of Fig. 6.

Due to the centrifugal force imparted by the thresher cone 124, the laminae, or leaf-fragments, and stems are forced from the conical portion of housing 74 into cylindrical portion 74-A thereof which is provided with a guide plate 188 extending upwardly from the outlet duct 190 (Fig. 8). The flow of air created by the fan 172 carries the laminae and stems upwardly into the duct 190 which has an outlet 191 above the conveyor belt 28 as shown in Fig. 1. The stems strike the baffle plate 194 and drop out through a suitable outlet 196 (Fig. 4). As illustrated in Fig. 1, said stems may be fed into the intake 30 of another cone thresher 26a whose construction is similar to cone thresher 26, wherefore further illustration thereof is deemed unnecessary. Any laminae which may remain on the stems delivered to cone thresher 26a are removed therefrom by the coaction of beater bars (not shown). The cone thresher 26a is provided with a fan (not shown) driven from motor 186 by a belt 184a, and the separated stems and laminae are carried out an outlet duct 192a, the stems dropping through outlet 196a into box R and the laminae dropping through outlet 191a upon belt 28a.

Referring now to Fig. 3, the improved apparatus may be modified, as shown therein, by employing a stemming machine in addition to a threshing machine instead of a set of threshing machines. In this modified form the tobacco leaves L are spread by an operator upon an endless conveyor belt 200 which is supported and driven in th same manner as belt 10 and delivers said leaves upon another pair of conveyor belts 202 and 204 supported and driven in the same manner as belts 12 and 14, and separated by a narrow space 206 through which protrude a pair of rotating cutting knives 208 which are of the same type and construction as the cutting knives shown in Figs. 1 and 2. A weight 210 and a pair of guide belts 212 are also provided and have the same function, and are of the same construction, as weight 52 and guide belts 54 shown in Fig. 1. After the tip portions of the leaves are severed from the butt portions, the former travel over another endless conveyor belt 214 which delivers said tip portions on to a feed belt 216. The butt portions of the leaves are delivered on to another conveyor belt 218 which guides said butt portions through a butt threshing mechanism C whose construction is shown and described in my Letters Patent No. 2,050,765. Said butt threshing cleaning device cleans enough laminae away from the stem so the latter may easily be properly gripped by the gripper fingers of the stemming machine later on. Upon leaving the butt cleaning device C, the protruding stem butt portions P are engaged by a leaf separator unit U which feeds said leaves into the gripper fingers G of a stemming machine H where the rest of the laminae are stripped from the butt end portions of the leaves. The leaf separator unit U may be of the same type and construction shown and described in my Letters Patent No. 1,992,773 or 1,968,098, and the tobacco stemming machine H is of the same type and construction as the one disclosed in my Letters Patent No. 1,968,098. The laminae E which are stripped from the stems by said stemming machine, are deposited upon a cross conveyor belt 220 which feeds said laminae, or leaf fragments, on to the tip portions of the leaves travelling underneath said belt on feed belt 216. After the stripping operation, the stems S are released by the gripper fingers G of the stemming machine and guided through a suitable chute 222 into a hopper 224 of a cone thresher 26b whose construction is similar to the cone thresher 26 described heretofore. The laminae, or leaf fragments F, beaten off the stem butts by the butt cleaning device C are delivered therefrom to a suitable conveyor belt 226 and forwarded thereon into hopper 224 of cone thresher 26b. The fragments F and the stems S are cleaned and separated from any heavy stem portions in cone thresher 26b, and the laminae K are deposited upon another cross belt conveyor 228 which delivers said laminae K on to the tip portions T travelling underneath said conveyor 228 on feed belt 216. The latter feeds the tip portions T together with the leaf laminae E and K into a suitable tobacco cutter (not shown) wherein they are cut into shreds as is customary in the manufacture of cigarette tobacco.

What is claimed is:

1. In a stemming apparatus, the combination with a pair of spaced endless traveling belts adapted to support respectively the tip end portions and butt end portions of tobacco leaves and advance the same transversely of their lengths, of means for severing the portions of the tobacco leaves intermediate said belts, to separate the tip portions from the butt end portions thereof, a conveyor arranged to receive the severed tip portions from one of said belts and advance them to a predetermined position, and means arranged to receive the severed butt end portions from the other of said belts and operating to disintegrate and winnow the severed butt end portions to separate the laminae from the stem portions thereof, said means including a housing having an intake arranged to receive the severed butt end portions, a single revoluble support arranged within said housing, thresher elements mounted on said support, and opposed members in the lower portion of said intake coacting to advance the severed butt end portions gradually in a pendant position into the path of said thresher elements, whereby the laminae are removed from the stem portions of the severed butt end portions while they are being fed by said members and the separated laminae will be winnowed from the stem portions within said housing.

2. In a stemming apparatus, the combination with a pair of spaced endless traveling belts adapted to support respectively the tip end portions and butt end portions of tobacco leaves and advance the same transversely of their lengths, of means for severing the portions of the tobacco leaves intermediate said belts, to separate the tip portions from the butt end portions thereof, a conveyor arranged to receive the severed tip portions from one of said belts and advance them to a predetermined position, means arranged to receive the severed butt end portions from the other of said belts and operating to disintegrate and winnow the severed butt end portions to separate the laminae from the stem portions thereof, said means including a housing having an intake into which the severed butt end portions are advanced by the belt on which they are supported, a revoluble support arranged within said housing, thresher bars mounted on the periphery of said support, opposed members arranged within the upper portion of said intake to admit therebetween the severed butt end portions from the belt on which they are advanced and feed them stem butt uppermost into the lower portion of said intake, and opposed feed rolls in the lower portion of said intake coacting to advance the severed butt end portions gradually into the path of said thresher bars with the severed ends thereof foremost, whereby the laminae are removed from the stem portions thereof by said thresher bars while the severed butt end portions are being fed into said housing by said rolls.

3. The combination with a housing provided with a vertical intake, of a revoluble member mounted within said housing, a series of thresher bars mounted on the periphery of said member and movable past said intake, a pair of feed rolls mounted adjacent the bottom of said intake and coacting to feed leaf tobacco downwardly and gradually in a pendant position into the range of action of said thresher bars whereby the laminae will be beaten off the leaf tobacco by said thresher bars as it is advanced downwardly by said rolls.

4. The combination with a housing provided with a vertical intake, of a revoluble member mounted within said housing, a series of thresher bars mounted on the periphery of said member and movable past said intake, a pair of feed rolls mounted adjacent the bottom of said intake and coacting to feed leaf tobacco downwardly and gradually in a pendant position into the range of action of said thresher bars whereby the laminae will be beaten off the leaf tobacco by said thresher bars as it is advanced by said rolls, said housing having a frustro-conical wall wherein is provided a slot through which leaf tobacco may be fed into said housing from said intake by said rolls, said rolls being disposed adjacent said slot and arranged in parallelism to said wall.

5. The combination with a housing provided with an inlet in its top through which tobacco may be fed, of a revoluble member mounted within said housing, a series of thresher bars mounted on said member, and a pair of feed rolls coacting to feed leaf tobacco vertically through said inlet into the range of action of said thresher bars, and means for driving said feed rolls and member with the linear speed of the feed rolls substantially less than linear speed of said member whereby the laminae will be beaten off the leaf tobacco by the action of the thresher bars thereon.

6. The combination with a housing provided with an intake, of a revoluble member mounted within said housing, a series of thresher bars mounted on the periphery of said member and movable past said intake, a pair of feed rolls mounted adjacent the bottom of said intake and coacting to feed leaf tobacco gradually into the range of action of said thresher bars whereby the laminae will be beaten off the leaf tobacco by said thresher bars as it is advanced by said rolls, and a pair of upper opposed rolls disposed within the top of said intake with said upper rolls being arranged to admit severed butt portions transversely therebetween and feed them downwardly into said intake with their stem butts pointing upwardly.

7. The combination with a housing adapted to admit leaf tobacco and having a frusto-conical portion, of a frusto-conical revoluble member disposed within the frusto-conical portion of said housing, a series of thresher bars having a set of teeth and mounted on the periphery of said member, and a series of thresher bars having a set of teeth and mounted on the interior of the frusto-conical portion of said housing, said member being axially adjustable to vary the spacing between the teeth of the thresher bars on said member and the teeth of the thresher bars on said housing.

8. The combination with a housing adapted to admit leaf tobacco and having a frusto-conical portion, of a revoluble member disposed within the frusto-conical portion of said housing, a series of thresher bars having a set of teeth and mounted on the periphery of said member, and a series of thresher bars having a set of teeth and mounted on the interior of the frusto-conical portion of said housing, said member being axially adjustable to vary the spacing between the teeth of the thresher bars on said member and the teeth of the thresher bars on said housing, the thresher bars on said housing being individually adjustable to vary the spacing between their teeth and the teeth of the thresher bars on said member.

9. The combination with a housing having a frusto-conical portion having an inlet arranged to admit leaf tobacco into the frusto-conical portion of said housing, of a frusto-conical member revolubly mounted within said frusto-conical portion, thresher bars mounted on the periphery of said frusto-conical member, thresher bars mounted on the interior of said frusto-conical portion, the thresher bars on said housing and members having suitably spaced indentations providing teeth on the respective bars which are adapted to interfit each other as said member is revolved, the thresher bars on said frusto-conical member being spirally arranged thereon and coacting with the thresher bars on said housing to thresh laminae from leaf tobacco.

10. The combination with a housing having an inlet arranged to admit leaf tobacco into the housing, a shaft revolubly mounted within said housing, thresher bars supported on said shaft, thresher bars mounted on the interior of said housing and coacting with the thresher bars on said shaft to thresh laminae from leaf tobacco, said housing being provided with an outlet through which the threshed leaf tobacco may be impelled, said outlet having a duct through which stem pieces are delivered and a duct through which laminae are delivered, a fan loosely mounted on said shaft and adapted to impel the threshed tobacco through said outlet whereby the stem pieces and laminae will be delivered through their respective ducts, and means for driving said shaft and fan at different speeds.

11. The combination with a housing having a frusto-conical portion provided with an inlet adapted to admit leaf tobacco, of a frusto-conical member revolubly mounted within the frusto-conical portion of said housing, thresher bars mounted on said member and provided with triangular teeth having vertical and horizontal faces, and thresher bars disposed within the interior of the frusto-conical portion of said housing and provided with triangular teeth having vertical and horizontal faces and adapted to interfit the triangular teeth of the thresher bars supported on said revoluble member and remove the laminae from the leaf tobacco admitted into said housing through its inlet.

12. The combination with a housing having an inlet adapted to admit leaf tobacco, of a member revolubly mounted within said housing, said housing and said member being provided with thresher teeth having horizontal and vertical faces and arranged to interfit with each other during the rotation of said member, and means for adjusting the horizontal and vertical spacing between the horizontal and vertical faces of the teeth on said member and the teeth on said housing.

13. The combination with a housing having an inlet adapted to admit leaf tobacco, of a member revolubly mounted in said housing, said housing and said member being provided with thresher teeth arranged to interfit with each other during the rotation of said member, and means for adjusting the teeth on said member to vary the spacing between the teeth on said member and the teeth on said housing.

14. In a tobacco leaf stemming device, the combination with a housing, of a rotor mounted for rotation within said housing, said rotor and housing being provided with opposed sets of triangular teeth arranged to interfit with each other and remove the laminae of tobacco leaves from the stems, said teeth having faces meeting at an angle of approximately 90 degrees, and being arranged with the tooth faces of the teeth on the housing substantially parallel to the tooth faces of the teeth on the rotor, and means for adjusting said teeth to vary the spacing between the tooth faces at one side of the teeth on the housing and rotor without varying the spacing between the tooth faces at the other side of said teeth.

15. In a tobacco leaf stemming device, the combination with a frusto-conical housing, of a frusto-conical rotor mounted for rotation within said housing, said housing and rotor being provided with opposed sets of triangular teeth arranged to interfit with each other and remove the laminae of tobacco leaves from the stems, said teeth having faces meeting at an angle of approximately 90 degrees, and being arranged with the faces at one side of the teeth on said rotor substantially perpendicular to the axis of the rotor and the faces at the other side thereof substantially parallel to the axis of the rotor.

RUPERT E. RUNDELL.